Figure 1:
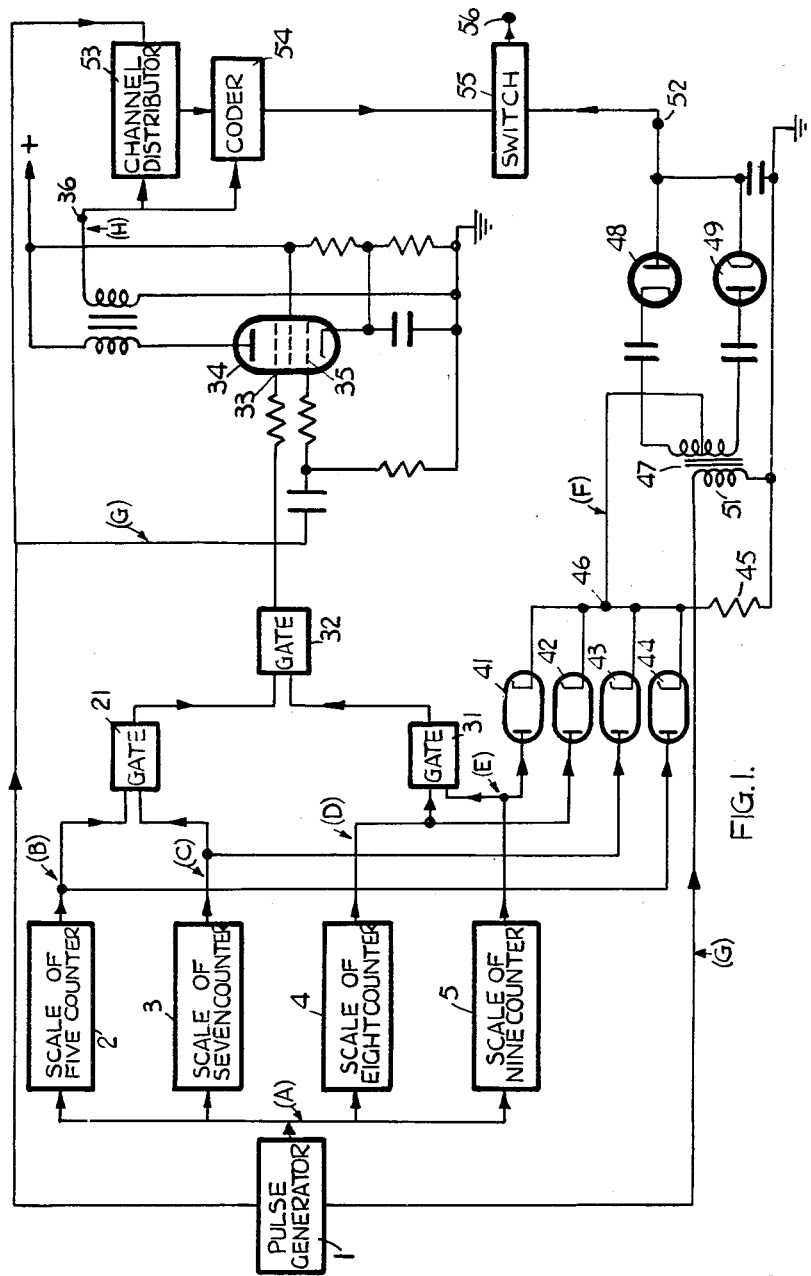

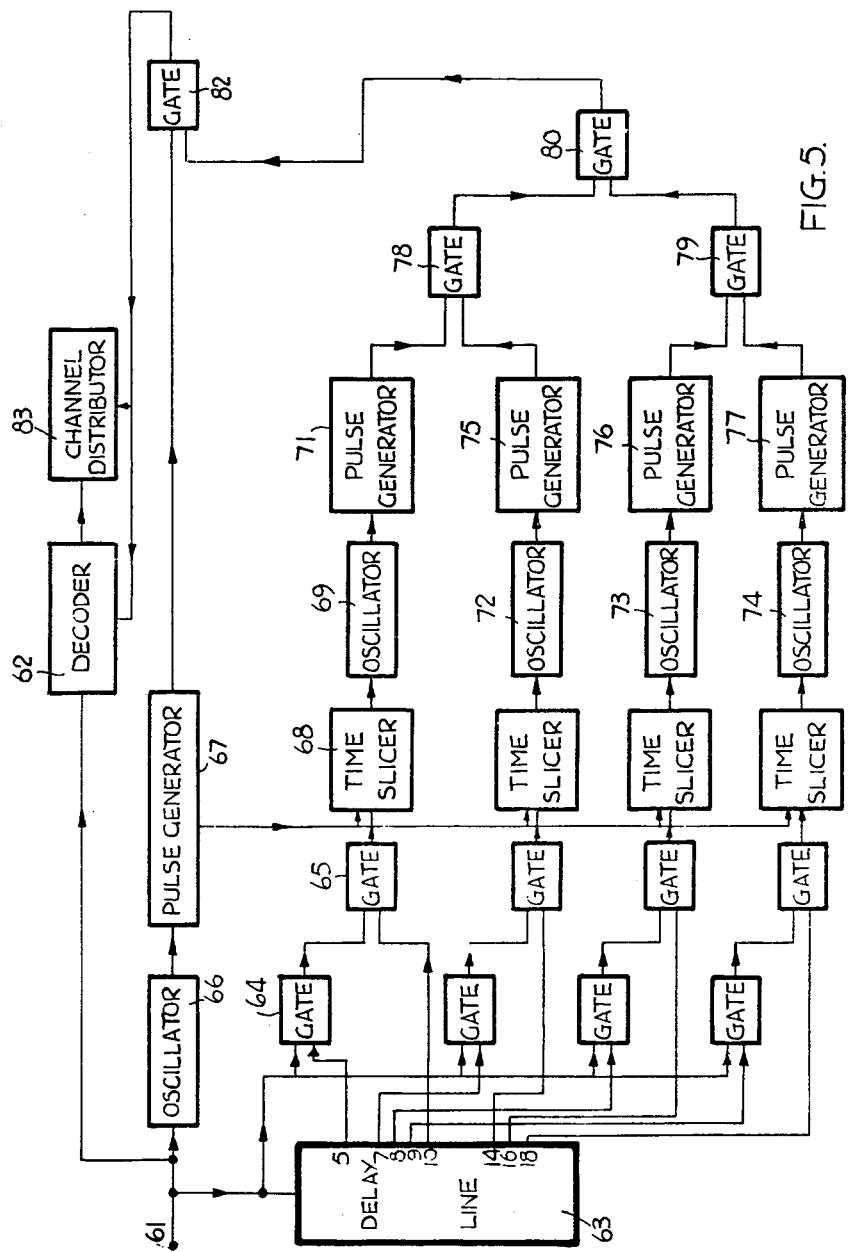

United States Patent Office 2,756,274
Patented July 24, 1956

2,756,274

PULSE SIGNALLING SYSTEMS

Luis Charles Stenning, Ealing, England, assignor to The General Electric Company Limited, London, England Application February 18, 1952, Serial No. 272,114

Claims priority, application Great Britain February 20, 1951

6 Claims. (Cl. 179—15)

This invention relates to pulse signalling systems.

One object of the present invention is to transmit a signal which identifies a particular instant, or succession of instants, in time.

In pulse signalling systems which utilise pulse code modulation, intelligence is usually transmitted merely by the presence or absence of pulses at regularly recurrent pulse time-positions. At the transmitting terminal, the signal to be transmitted may be periodically sampled and each sample represented by pulses at a group of a small number, for example, five pulse time-positions which approximately define the amplitude of the sample. At the receiving terminal it is necessary for the apparatus which decodes the pulse signal to be accurately synchronized in frequency with the coding apparatus at the transmitting terminal. Moreover since there is no way of distinguishing between the different pulse time-positions of each group, it is necessary for the decoding apparatus to be locked in time with the coding apparatus.

Frequency synchronising of the receiving apparatus may be effected by having an oscillator which is loosely locked by the pulses of the received pulse code signal, there being arranged always to be sufficient pulses in this signal to synchronize the oscillator. A further object of the present invention is therefore to provide a simple method of carrying out the required time synchronizing.

According to the present invention, a pulse signalling system comprises a transmitting terminal and a receiving terminal to which is arranged to be transmitted a pulse signal over a signalling path between the two terminals and, for the purpose of identifying a particular instant or succession of instants, the transmitting terminal is provided with means to generate at least two trains of pulses which have different pulse recurrence frequencies $F/a$, $F/b$ etc. where $a$, $b$ etc. are different integers each greater than unity and having no common factor, and means to combine by addition trains of pulses into a single train of pulses that is transmitted and in which the pulses are themselves indistinguishable from one another, and the receiving terminal is provided with means to supply separate trains of pulses having pulse recurrence frequencies $F/a$, $F/b$ etc. when trains of pulses having those recurrence frequencies are present in the received signal, and means operable upon the simultaneous occurrence of pulses in all said derived trains.

The instant to which the several trains point may be utilized to time synchronize apparatus at the two ends of the signalling path. The several trains may point to instants which occur periodically at a relatively low frequency or alternatively the timing of these instants may be varied, that is to say time modulated, so as to convey intelligence which is to be signalled.

If now the integers $a$, $b$ etc. are such that no pair of them has a common factor, the instants of simultaneity occur at a frequency of $F/a \times b \times$—etc.

The time synchronizing equipment of a twelve-channel pulse signalling system in accordance with the invention will now be described by way of example with reference to the five figures of the accompanying drawings. In the drawings, Figure 1 shows diagrammatically the circuit of the equipment at the transmitting terminal of the system, while Figures 2(a) to (h) show the waveforms of signals at the points marked (A), (B), (C) . . . etc. respectively in Figure 1. Figures 3 and 4 show parts of the equipment of Figure 1 in more detail and Figure 5 shows diagrammatically the equipment at the receiving terminal of the system.

The signalling system uses pulse code modulation and the twelve signals to be transmitted are sampled in turn and the amplitude of each sample represented by a group of five pulse time-positions at each of which there either is or is not a signal pulse dependent upon the particular sample amplitude. The frequency of recurrence of the pulse time-positions is 480 kilocycles per second so that, when first setting up the system, and for the reason previously discussed, it is necessary to identify a particular time instant to an accuracy of approximately plus or minus one micro-second in order to obtain the required time, or phase, registration between coding and decoding apparatus at the transmitting and receiving terminals respectively of the system.

Since, however, no transmission of the signals on any of the twelve channels can be carried out until this time synchronising is effected, the whole of the time, which during normal operation is allocated to the twelve-channels in turn is available and is utilised for synchronisation. Referring now to Figure 1 of the drawings, operation of the coding apparatus 54 is controlled by a pulse generator 1 which is adapted to generate a train of positive-going pulses having a recurrence frequency of approximately 480 kilocycles per second and this train of pulses is supplied to four counters 2, 3, 4 and 5. A signal having the waveform of Figure 2(a) is therefore supplied to the counter 2 which is arranged to produce a single positive-going pulse after every five pulses 6 so that the pulses 7 in the output signal shown in Figure 2(b) have a recurrence frequency of 96 kilocycles per second.

Figure 2:
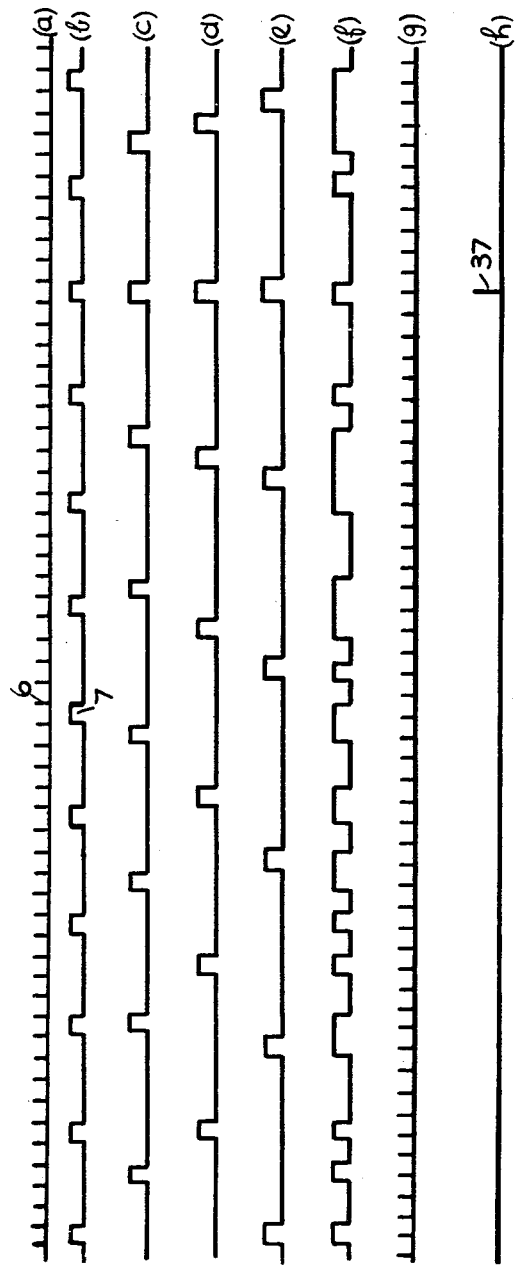
Figure 3:
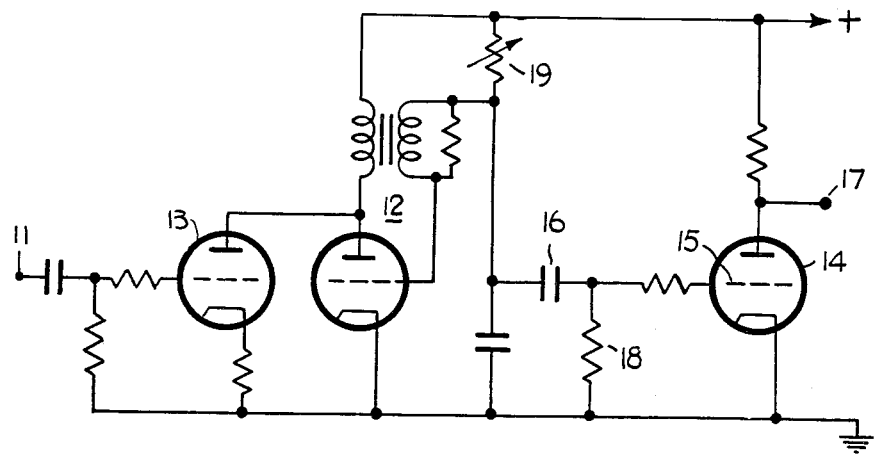
Figure 4:
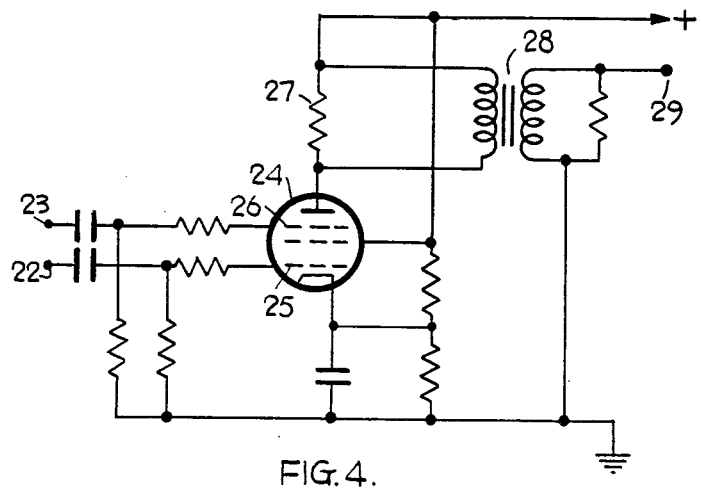

The counter 2 is shown in more detail in Figure 3, the signal having the waveform of Figure 2(a) being applied to the terminal 11. The counter comprises a blocking oscillator 12 and the pulses applied to the terminal 11 are passed through a valve 13 to the oscillator 12 for the purpose of synchronisation. A triode valve 14 is arranged normally to be conducting but during the period of flyback of the oscillator 12 the grid 15 receives a negative bias through the condenser 16 so that a positive-going pulse is developed at the output terminal 17. The time constant of the circuit formed by the condenser 16 and a grid leak resistor 18 is arranged to be small so that the pulses 7 in the waveform of Figure 2(b) have a duration of the order of 2.1 microseconds. The value of the preset resistor 19 in the grid circuit of the oscillator 12 determines the frequency of operation of the oscillator and thereby the number of applied pulses that are "counted" before a pulse is developed at the terminal 17.

The counters 3, 4 and 5 are similar to the counter 2 but are arranged to supply signals having the waveforms shown in Figures 2(c), (d) and (e). The counters 3, 4 and 5 thus produce pulses after every seventh, eighth and ninth pulse respectively supplied by the generator 1.

The instance when pulses occur simultaneously in the signals supplied by the counters 2, 3, 4 and 5 are used for synchronising the channel multiplexing apparatus at the transmitting and receiving terminals of the system and also of the coding apparatus at the transmitting terminal and the decoding apparatus at the receiving terminal.

Referring again to Figure 1, the signals supplied by the counters 2 and 3 are applied to a gate 21 which is adapted to supply a positive-going pulse only when the pulses in the two applied signals occur simultaneously. This gate is shown in more detail in Figure 4, the signals supplied by the counters 2 and 3 being applied to the terminals 22 and 23. The gate comprises a pentode thermionic valve 24 to the control grid 25 and the suppressor grid 26 of which are fed the two applied signals. The valve 24 is arranged normally to be non-conducting so that anode current only flows through the resistor 27 when pulses are applied simultaneously to the terminals 22 and 23. The resulting signal developed across the resistor 27 is supplied to a phase reversing transformer 28 so that the required positive-going pulse is produced at the output terminal 29.

The output signals from the counters 4 and 5 are similarly applied to a gate 31 while the output signals from the gates 21 and 31 are applied to a gate 32. The gates 31 and 32 are identical to the gate 21 so that the signal passed by the gate 32 consists of pulses which each occur only when there are pulses at the same instant in the waveforms of Figures 2(b), (c), (d) and (e) that is to say when pulses occur simultaneously in the signals supplied by the counters 2, 3, 4 and 5.

The output signal from the gate 32 is supplied to the suppressor grid 33 of a pentode thermionic valve 34 while a gating signal having the waveform of Figure 2(g) is supplied from the generator 1 to the control grid 35. The required synchronising signal having the waveform of Figure 2(h) is thus produced at the output terminal 36. The pulses 37 in the waveform of Figure 2(h) occur at a frequency of $$\frac{480,000}{5+7+8+9}$$

per second, that is to say approximately 191 times per second.

The signal developed at the point 36 is therefore used to lock the phase of the generators (not shown) which control the time multiplexing apparatus 53 and the coding apparatus 54. These generators may be oscillators or may be integrating counters, sometimes referred to as staircase counters, which are supplied with trains of regularly recurrent pulses and which reset after counting a predetermined number of pulses so as to produce trains of pulses having a sub-harmonic recurrence frequency.

In order to transmit a synchronising signal to the receiving terminal of the system the trains of pulses supplied by the counters 2, 3, 4 and 5 are added together and transmitted in place of the normal pulse code signal. The four signals having the waveforms of Figure 2(b), (c), (d) and (e) are arranged to be fed through associated diode valves 41, 42, 43 and 44 and a resistor 45 so that the point 46 is held to the highest voltage of any of the four signals and thus the voltage at the point 46 has the waveform shown in Figure 2(f). Since the duration of each of the pulses, for example the pulse 7, in these four signals is not accurately determined, it is necessary to effect time slicing and this is done by means of a transformer 47 and a pair of diode valves 48 and 49. A signal having the waveform of Figure 2(g) is supplied to the primary winding 51 of the transformer 47 so that the required output signal is developed at the point 52. The amplitude, width and waveform of the pulses forming this signal are identical with and therefore in themselves indistinguishable from those of the pulse code signal which carries the intelligence of the twelve channels when the system is in normal use.

The signal developed at the point 52 is arranged to be transmitted in place of the normal pulse code modulation which carries the intelligence on the twelve channels and for that purpose a changeover switch or relay 55 is provided so that when synchronisation is to be effected the signal developed at the terminal 52 is supplied to a terminal 56 in place of the output from the coding apparatus 54. The signal at the terminal 56 is fed to the modulator (if a radio link is provided between the terminals of the system) or other transmitting device.

At the receiving terminal it is necessary to identify the four component pulse signals that may be transmitted in place of the normal pulse code signal carrying the channel intelligence to effect synchronisation. Thus, referring now to Figure 5, the received pulse code signal is applied to a terminal 61 and from there is fed both to the decoding apparatus 62 and to a delay line 63. Considering now the means for separating and identifying the pulse train in which the pulses occur at the frequency of those in the waveform of Figure 2(b), a gate 64 is arranged to be supplied with the applied pulse code signal as received and after it has been delayed by 10.5 micro-seconds which is the period equal to that in which five pulse time-positions are transmitted in the normal pulse code signal. The gate 64, which is similar to that previously described with reference to Figure 4, is arranged to supply a pulse only when pulses occur in both the signals supplied thereto. The gate 64 thus supplies a pulse every time two pulses in the received signal are spaced apart by a time equal to the required spacing of the pulses in the component signal to be identified. In order to reduce the possibility of false operation when two pulses in other component trains are separated by this time spacing or when pulses occur with this spacing during normal operation, the output from the gate 64 and a further signal from the delay line 63 which has been delayed for a total period equal to that in which ten pulse time-positions are transmitted are supplied to a gate 65.

An oscillator 66 is arranged to have its operating frequency locked by the pulse code signal fed to the terminal 61 and the output from this oscillator 66 is supplied to a pulse generator 67. The output from the generator 67 consists of pulses having a recurrence frequency equal to the frequency at which the pulse time-positions occur in the received signal and this pulse signal is utilised to effect time slicing of the signal passed by the gate 65. The output from the time slicer 68 (which is similar to the time slicer formed by the transformer 47 and the diode valves 48 and 49 in Figure 1) is fed to an oscillator 69 (which is similar to the oscillator 12 in Figure 3). The oscillator 69 is thus phase locked by pulses which have the correct spacing in the received signal and the output from the oscillator 69 is supplied to a pulse generator 71 (which is similar to the valve 14 and its associated circuitry in Figure 3) so that the output from the generator 71 has the waveform shown in Figure 2(b).

Three additional oscillators 72, 73 and 74 are arranged to be phase locked by signals obtained by gating the pulse code signals developed at different tapping points along the delay line 63 so that the signals, if any, supplied by the pulse generators 75, 76 and 77 have the waveform of Figures 2(c), (d) and (e). The signals supplied by the pulse generators 71, 75, 76 and 77 are gated by means of gates 78, 79 and 80 which are arranged in similar manner to the gates 21, 31 and 32 at the transmitting terminal of the system. The output from the gate 80 is utilised to gate the output from the pulse generator 67 so that the gate 82 acts in similar manner to the valve 34 and its associated circuitry at the transmitting terminal to provide a signal consisting of pulses each of which occur when pulses are supplied simultaneously by the generators 71, 75, 76 and 77. The signal supplied by the gate 82 thus has the waveform of Figure 2(h) when the synchronising signal is being transmitted and this signal is supplied to the decoding apparatus 62 and the time multiplexing apparatus 83 which is adapted to distribute the transmitted intelligence to the twelve channels.

It will be appreciated that pulses are only supplied from the gate 82 to the decoding apparatus 63 and the channel distributing apparatus 83 when the four trains of pulses supplied by the counters 2, 3, 4 and 5 (in Figure 1) are being transmitted and that during normal operation it is extremely unlikely that any pulse will be supplied by the gate 82.

The signals passed by the gate formed by the valve 34 and its associated circuitry at the transmitting terminal and by the gate 82 at the receiving terminal have the same waveform when the synchronising signal is being transmitted but these two signals may not be exactly in phase and it may therefore be necessary to provide a delay network so that the pulses supplied to the apparatus to be synchronised occur at the right instants. If the recurrence frequency of the pulses in the synchronising signals passed by these gates is required to be lower, this may be done by increasing the number of sub-harmonic trains of pulses that are transmitted and/or by increasing the numbers of pulses counted by the counters 2, 3, 4 and 5. Thus, if trains of the fifth, seventh, twelfth, thirteenth, seventeenth and nineteenth sub-harmonics of the pulse signal having the 480 kilocycles per second recurrence frequency are used, pulses only occur simultaneously in all six trains approximately once every 3.7 seconds. In that case, if it is desired to identify a particular instant, a suitable signal may be sent between two successive instants of simultaneity to indicate that the one after that signal is the required instant. This signal may take the form of a "pip" sent over a voice frequency channel such as an engineers' or operators' channel associated with or forming part of the pulse signalling system.

When the system is synchronised and is operating normally, pulses in a particular time-position in the multiplex may be given a characteristic modulation which is used as a check to ensure that the decoding apparatus and channel distributing apparatus keep in time registration with the received signal as described in co-pending British patent application No. 8243/51. That arrangement ensures that the received signal and the decoding apparatus are in register but if they slip so as to be more than two pulse time-positions out of register an alarm signal may be sent over a suitable channel, for example an engineers' or operators' channel of a similar multi-channel signalling system operating in the other direction or alternatively one of the main channels of that other system may be seized temporarily and the alarm signal transmitted over it. Upon receipt of this alarm signal at the transmitting terminal, the switch or relay 55 at that terminal may be operated so as to transmit the trains of pulses as previously described in place of the normal pulse code modulation for the purpose of resynchronising the coding and decoding apparatus at the terminals.

I claim:

1. Apparatus for generating an electric signal that identifies a particular instant or succession of instants comprises means for producing simultaneously at least two separate electric pulse signals which consist of trains of pulses having different pulse recurrence frequencies $F/a$, $F/b$ etc., where $a$, $b$ etc. are different integers each being greater than unity and having no common factor, and means for combining by addition the separate pulse signals to produce a single electric pulse signal in which the pulses are themselves indistinguishable from one another.

2. Apparatus responsive to an electric signal in which the pulses are themselves indistinguishable from one another and which is formed by combining at least two simultaneous trains of pulses having different pulse recurrence frequencies $F/a$, $F/b$ etc., where $a$, $b$ etc. are different integers each greater than unity and having no common factor, which apparatus comprises means to separate from an applied signal component trains of pulses having pulse recurrence frequencies $F/a$, $F/b$ etc., and means responsive to the simultaneous occurrence of pulses in all the component trains of pulses.

3. A pulse signalling system comprising a transmitting terminal and a receiving terminal to which is arranged to be transmitted a pulse signal over a signalling path between the two terminals wherein, for the purpose of identifying a particular instant or succession of instants, the transmitting terminal is provided with means to generate at least two trains of pulses which have different pulse recurrence frequencies $F/a$, $F/b$ etc. where $a$, $b$ etc. are different integers each greater than unity and having no common factor, and means to combine by addition said trains of pulses into a single train of pulses that is transmitted and in which the pulses are themselves distinguishable from one another, and the receiving terminal is provided with means to supply separate trains of pulses having pulse recurrence frequencies $F/a$, $F/b$ etc., when trains of pulses having those recurrence frequencies are present in the received signal, and means operable upon the simultaneous occurrence of pulses in all said derived trains.

4. A pulse signalling system according to claim 3 wherein the transmitting terminal has means to time synchronize apparatus at that terminal upon the simultaneous occurrence of pulses in all the said trains of pulses generated at that terminal and the receiving terminal has means to time synchronize apparatus at that terminal upon the simultaneous occurrence of pulses in all the said derived trains of pulses.

5. A pulse signalling system according to claim 3 wherein the pulse signal transmitted is obtained by combining more than two trains of pulses and the integers $a$, $b$ etc. of all the trains are such that no pair of them has a common factor.

6. A pulse signalling system which utilizes pulse code modulation comprising a transmitting terminal and a receiving terminal to which is arranged to be transmitted a pulse code signal over a signalling path between the two terminals, the transmitting terminal comprising coding apparatus which supplies the pulse code signal that is transmitted during normal signalling, means to generate at least two trains of pulses which have different pulse recurrence frequencies $F/a$, $F/b$ etc. where $a$, $b$ etc. are different integers each being greater than unity and having no common factor, means to combine by addition the said trains of pulses to form a synchronizing signal which consists of a single train of pulses and in which the pulses are themselves indistinguishable from one another, and means to transmit the synchronizing signal in place of the pulse code signal supplied by the coding apparatus, and means to time synchronize the coding apparatus upon the simultaneous occurrence of pulses in all the said trains of pulses, and the receiving terminal comprising decoding apparatus to which is supplied the received pulse code signal, means to supply separate trains of pulses having pulse recurrence frequencies $F/a$, $F/b$ etc. when trains of pulses having those recurrence frequencies are present in the received pulse signal, and means to time synchronize the decoding apparatus upon the simultaneous occurrence of pulses in all the said derived trains of pulses.

References Cited in the file of this patent

UNITED STATES PATENTS

| | | |
|---|---|---|
| 2,466,044 | Schoenfeld | Apr. 5, 1949 |
| 2,504,852 | Lewis | Apr. 18, 1950 |
| 2,557,729 | Eckert | June 19, 1951 |
| 2,566,085 | Green | Aug. 28, 1951 |